(12) United States Patent
Tortelli et al.

(10) Patent No.: US 9,574,037 B2
(45) Date of Patent: Feb. 21, 2017

(54) CROSS-LINKABLE POLYMERS COMPRISING SULFONIC ACID FUNCTIONAL GROUPS

(71) Applicant: SOLVAY SPECIALTY POLYMERS ITALY S.P.A., Bollate (IT)

(72) Inventors: Vito Tortelli, Milan (IT); Cristiano Monzani, Trezzo Sull'Adda (IT); Claudio Oldani, Nerviano (IT); Luca Merlo, Montorfano (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 14/786,196

(22) PCT Filed: Apr. 16, 2014

(86) PCT No.: PCT/EP2014/057822
§ 371 (c)(1),
(2) Date: Oct. 22, 2015

(87) PCT Pub. No.: WO2014/173782
PCT Pub. Date: Oct. 30, 2014

(65) Prior Publication Data
US 2016/0090429 A1    Mar. 31, 2016

(30) Foreign Application Priority Data
Apr. 22, 2013 (EP) ..................................... 13164690

(51) Int. Cl.
  *C08F 214/26* (2006.01)
  *C08L 27/18* (2006.01)
  *C08F 216/14* (2006.01)

(52) U.S. Cl.
  CPC ............ *C08F 214/262* (2013.01); *C08L 27/18* (2013.01); *C08F 2216/1475* (2013.01)

(58) Field of Classification Search
  None
  See application file for complete search history.

(56) References Cited

U.S. PATENT DOCUMENTS

| 4,940,525 A | 7/1990 | Ezzell et al. |
| 6,365,693 B1 | 4/2002 | Hung |
| 2010/0093878 A1 | 4/2010 | Yang et al. |
| 2010/0324222 A1 | 12/2010 | Hung et al. |

FOREIGN PATENT DOCUMENTS

| EP | 661304 A1 | 7/1995 |
| EP | 860436 A1 | 8/1998 |
| EP | 1172382 A2 | 1/2002 |
| EP | 1238999 A1 | 9/2002 |
| EP | 1239000 A1 | 9/2002 |
| EP | 1323751 A2 | 7/2003 |
| WO | 9705122 A1 | 2/1997 |
| WO | 2010021962 A2 | 2/2010 |
| WO | 20130087498 A1 | 6/2013 |

OTHER PUBLICATIONS

Wlassics I. et al., "Perfluoro Allyl Sulfate (FAFS): a Versatile Buildng Block for New Fluoroallylic Compounds", Molecules, 2011, vol. 16, pp. 6512-6540.

*Primary Examiner* — Sanza McClendon

(57) ABSTRACT

The present invention pertains a fluoropolymer [polymer (F)] comprising: —recurring units derived from at least one ethylenically unsaturated fluorinated monomer [monomer (FM)]; —from 5% to 60% by moles [with respect to the total moles of recurring units of polymer (F)] of recurring units derived at least one ethylenically unsaturated fluorinated monomer containing at least one —$SO_2F$ functional group [monomer (IO)]; and —from 0.01% to 10% by moles [with respect to the total moles of recurring units of polymer (F)] of recurring units derived from at least one monomer comprising an azide group [monomer (Az)], to a process for its manufacture, to a cross-linkable composition comprising the same, to a process for cross-linking the same and to articles comprising the cross-linked polymer.

20 Claims, No Drawings

CROSS-LINKABLE POLYMERS COMPRISING SULFONIC ACID FUNCTIONAL GROUPS

This application is a U.S. national stage entry under 35 U.S.C. §371 of International Application No. PCT/EP2014/057822 filed Apr. 16, 2014, which claims priority to European application No. 13164690.3 filed on Apr. 22, 2013. The entire contents of these applications are explicitly incorporated herein by this reference.

TECHNICAL FIELD

The present invention relates to polymers comprising sulfonic acid functional groups having cross-linking ability and compositions thereof, to a process for the manufacture of said polymers, to a method for cross-linking the same, and to the articles comprising the cross-linked polymers obtained therefrom.

BACKGROUND ART

Fluorinated polymers containing sulfonic acid functional groups, due to their ion conducting properties, have found widespread use in the manufacture of electrolyte membranes for electrochemical devices such as electrolysis cells and fuel cells. Notable examples are for instance proton exchange membrane (PEM) fuel cells which employ hydrogen as the fuel and oxygen or air as the oxidant.

Fluorinated polymers containing sulfonic acid functional groups have also been known to provide hydrophilic fluorinated surfaces due to the presence of the sulfonic acid groups.

To provide a high proton transport capability to an electrolyte membrane or to efficiently interact with water in a hydrophilic fluorinated surface polymers having a high number of sulfonic acid groups are required, which however are generally provided with reduced mechanical and physical resistance with consequent negative effects on the duration of the articles obtained therefrom.

The use of cross-linking to improve the physical resistance of membranes made from fluorinated polymers containing sulfonic acid functional groups has been previously disclosed. For instance, EP 1238999 A (SOLVAY SOLEXIS SPA) 11 Sep. 2002 and EP 1239000 A (SOLVAY SOLEXIS SPA) 11 Sep. 2002 disclose hydrophilic membranes comprising cross-linkable sulfonic fluorinated polymers comprising: monomeric units deriving from tetrafluoroethylene, fluorinated monomeric units containing sulfonyl groups —SO$_2$F, and from 0.01% to 5% by moles of monomeric units deriving from a bis-olefin of formula R$_1$R$_2$C=CH—(CF$_2$)$_m$—CH=CR$_5$R$_6$ (wherein m=2-10, R$_1$, R$_2$, R$_5$, R$_6$, equal to or different from each other, are H or C$_1$-C$_5$ alkyl groups). The membranes are obtained by cross-linking of the sulfonic fluorinated polymer, the cross-linking involving the backbone of the polymer. The membranes are suitable both for use as ion conducting membranes in electrochemical cells as well as filtration membranes.

The use of bis-olefins of formula R$_1$R$_2$C=CH—(CF$_2$)$_m$—CH=CR$_5$R$_6$ suffers however from the drawback that, due to the low boiling temperature of the bis-olefin, fractions of the bis-olefin are lost by evaporation during the manufacturing steps of the membrane reducing the effectiveness of the cross-linking process.

Thus the need still exist for providing articles, in particular membranes, with improved physical and mechanical resistance by the cross-linking of fluorinated polymers comprising sulfonic acid functional groups without affecting the ion conducting capability and hydrophilicity of the polymer and with a process having improved efficiency.

It has now been found that the incorporation of azide-containing monomers into the fluorinated polymers comprising sulfonic acid functional groups provides a solution to the limitations of the prior art process.

The incorporation of azide-containing monomers in fluoropolymer chain has been described in the art, in particular for fluoroelastomers.

Thus, U.S. Pat. No. 6,365,693 (DUPONT DOW ELASTOMERS LLC) 2 Apr. 2002 discloses the incorporation of compounds of formula:

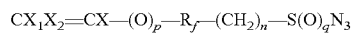

wherein: X, X$_1$ and X$_2$ are independently H or F, p is 0 or 1, n is 0-4, q is 1 or 2, R$_f$ is a perfluoroalkyl or a perfluoroalkoxy group, as cure-site monomers in copolymers of fluorinated monomers, at least one of them being selected from VDF, TFE and chlorotrifluoroethylene (CTFE).

Similarly, US 2010324222 (DUPONT PERFORMANCE ELASTOMERS L.L.C.) 23 Dec. 2010 discloses a fluoroelastomer comprising copolymerized units of:
- a first monomer selected from vinylidene fluoride and tetrafluoroethylene, and
- a cure site monomer having a cure site selected from azide, sulfonyl azide and carbonyl azide groups.

WO 2010/021962 A (3M INNOVATIVE PROPERTIES COMPANY) 25 Feb. 2010 discloses fluoropolymers containing one or more azide groups different from sulfonyl-azide groups.

None of these documents however disclose fluorinated polymers comprising sulfonic acid functional groups as well as azide functional groups.

US 2010093878 (E I DU PONT DE NEMOURS AND COMPANY) 15 Apr. 2010 relates to crosslinkable fluoropolymers, crosslinked fluoropolymers and crosslinked fluoropolymer membranes. In greater detail, the crosslinkable fluoropolymers disclosed in this document comprise:
- from 70% to 95% by moles of recurring units derived from CR$_2$=CF$_2$ monomers, wherein R is H or F;
- from 10% to 30% by moles of recurring units derived from CR'$_2$=CR'—(O)$_q$—R$_f$SO$_2$F monomers, wherein R' is H or F, q is 0 r 1, with the proviso that when R' is F then q is 1 and R$_F$ is a linear or branched C$_1$-C$_{20}$ perfluoroalkylene group, optionally containing oxygen or chlorine, and
- from 1% to 8% by moles of recurring units derived from monomers having a vinyl ether end group, said monomers having formula CF$_2$=CF—OR'F—(CH$_2$)$_p$—Z, wherein R'F is a linear or branched C$_1$-C$_{20}$ perfluoroalkylene group, optionally containing oxygen or chlorine, p is 0 or 1 and Z is selected from SO$_2$N$_3$, OCN and CN. Non-limitative examples of monomers of formula CF$_2$=CF—OR'F—(CH$_2$)$_p$—Z include CF$_2$=CF—OR'F—CH$_2$—SO$_2$N$_3$, in particular CF$_2$=CF—O—CF$_2$CF(CF$_3$)—O—CF$_2$CF$_2$—SO$_2$N$_3$. This document does not disclose or suggest sulfonyl azide- or azide-containing monomers having end groups other than vinyl ether end groups.

SUMMARY OF INVENTION

It is thus an object of the present invention a fluoropolymer [polymer (F)] comprising:
recurring units derived from at least one ethylenically unsaturated fluorinated monomer [monomer (FM)];

from 5% to 60% by moles [with respect to the total moles of recurring units of polymer (F)] of recurring units derived at least one ethylenically unsaturated fluorinated monomer containing at least one —SO$_2$F functional group [monomer (IO)]; and from 0.01% to 10% by moles [with respect to the total moles of recurring units of polymer (F)] of recurring units derived from at least one monomer comprising an azide group [monomer (Az)].

Preferably, monomer (Az) does not comprise a (per) fluorovinyl ether end group of formula CF$_2$=CF—O—.

The Applicant has surprisingly found that the incorporation of recurring units derived from a monomer (Az) in a fluorinated polymer comprising sulfonic acid functional groups advantageously provides copolymers which can be easily cross-linked, including by thermal treatment and/or under UV irradiation but which are still endowed with the outstanding ionic conductivity and hydrophilic properties of the corresponding unmodified polymers.

The phrase "at least one monomer" is used herein with reference to the monomers defined above to indicate that one or more than one monomer of each type can be present in the polymer. Hereinafter the term monomer will be used to refer to both one and more than one monomer of a given type.

The expression "fluorinated polymer comprising sulfonic acid functional groups" is used herein to indicate both a polymer comprising sulfonic acid (—SO$_3$H) functional groups, their salified form (—SO$_3$M, wherein M is an alkaline metal, typically Na or K) as well as their neutral sulfonyl fluoride (—SO$_2$F) precursor form.

Polymer (F) as above defined comprises recurring units derived from at least one ethylenically unsaturated fluorinated monomer of type (FM). The expression "ethylenically unsaturated fluorinated monomer of type (FM)" refers to fluorinated monomers which do not contain any —SO$_2$F functional group and/or any azide group, that is fluorinated monomers different from monomer (IO) and monomer (Az).

Non limiting examples of suitable ethylenically unsaturated fluorinated monomers of type (FM) are:

C$_2$-C$_8$ fluoroolefins, such as tetrafluoroethylene (TFE), pentafluoropropylene, hexafluoropropylene (HFP), and hexafluoroisobutylene;

vinylidene fluoride (VDF);

C$_2$-C$_8$ chloro- and/or bromo- and/or iodo-fluoroolefins, such as chlorotrifluoroethylene (CTFE) and bromotrifluoroethylene;

fluoroalkylvinylethers of formula CF$_2$=CFOR$_{f1}$, wherein R$_{f1}$ is a C$_1$-C$_6$ fluoroalkyl, e.g. —CF$_3$, —C$_2$F$_5$, —C$_3$F$_7$;

fluoro-oxyalkylvinylethers of formula CF$_2$=CFOR$_{O1}$, wherein R$_{O1}$ is a C$_1$-C$_{12}$ fluoro-oxyalkyl having one or more ether groups, for example perfluoro-2-propoxy-propyl;

fluoroalkyl-methoxy-vinylethers of formula CF$_2$=CFOCF$_2$OR$_{f2}$ in which R$_{f2}$ is a C$_1$-C$_6$ fluoroalkyl, e.g. —CF$_3$, —C$_2$F$_5$, —C$_3$F$_7$ or a C$_1$-C$_6$ fluorooxyalkyl having one or more ether groups, like —C$_2$F$_5$—O—CF$_3$;

fluorodioxoles, of formula:

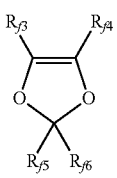

wherein each of R$_{f3}$, R$_{f4}$, R$_{f5}$, R$_{f6}$, equal or different each other, is independently a fluorine atom, a C$_1$-C$_6$ fluoro (halo)fluoroalkyl, optionally comprising one or more oxygen atom, e.g. —CF$_3$, —C$_2$F$_5$, —C$_3$F$_7$, —OCF$_3$, —OCF$_2$CF$_2$OCF$_3$.

Preferably monomer (FM) is selected among:

C$_2$-C$_8$ fluoroolefins, preferably tetrafluoroethylene (TFE) and/or hexafluoropropylene (HFP);

chloro- and/or bromo- and/or iodo-C$_2$-C$_6$ (per)fluoroolefins, like chlorotrifluoroethylene (CTFE) and/or bromotrifluoroethylene;

fluoroalkylvinylethers of formula CF$_2$=CFOR$_{f1}$ in which R$_{f1}$ is a C$_1$-C$_6$ fluoroalkyl, e.g. —CF$_3$, —C$_2$F$_5$, —C$_3$F$_7$;

fluoro-oxyalkylvinylethers of formula CF$_2$=CFOR$_{O1}$, in which R$_{O1}$ is a C$_1$-C$_{12}$ fluorooxyalkyl having one or more ether groups, like perfluoro-2-propoxy-propyl.

More preferably monomer (FM) is tetrafluoroethylene.

Polymer (F) further comprises at least one monomer of type (IO). Non limiting examples of suitable monomers (IO) are:

sulfonyl fluoride fluoroolefins of formula: CF$_2$=CF(CF$_2$)$_p$SO$_2$F wherein p is an integer between 0 and 10, preferably between 1 and 6, more preferably p is equal to 2 or 3;

sulfonyl fluoride fluorovinylethers of formula: CF$_2$=CF—O—(CF$_2$)$_m$SO$_2$F wherein m is an integer between 1 and 10, preferably between 1 and 6, more preferably between 2 and 4, even more preferably m equals 2; sulfonyl fluoride fluoroalkoxyvinylethers of formula:

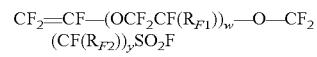

wherein w is an integer between 0 and 2, R$_{F1}$ and R$_{F2}$, equal or different from each other, are independently F, Cl or a C$_1$-C$_{10}$ fluoroalkyl group, optionally substituted with one or more ether oxygens, y is an integer between 0 and 6; preferably w is 1, R$_{F1}$ is —CF$_3$, y is 1 and R$_{F2}$ is F;

sulfonyl fluoride aromatic fluoroolefins of formula CF$_2$=CF—Ar—SO$_2$F wherein Ar is a C$_5$-C$_{15}$ aromatic or heteroaromatic substituent.

Preferably monomer (IO) is selected from the group of the sulfonyl fluoride fluorovinylethers of formula CF$_2$=CF—O—(CF$_2$)$_m$—SO$_2$F, wherein m is an integer between 1 and 6, preferably between 2 and 4.

More preferably monomer (IO) is CF$_2$=CFOCF$_2$CF$_2$—SO$_2$F (perfluoro-5-sulfonylfluoride-3-oxa-1-pentene).

Polymer (F) typically comprises at least 5%, preferably at least 7%, more preferably is at least 8% by mole of at least one monomer of type (IO). Typically the amount of recurring units derived from monomer (IO) does not exceed 60%, preferably it does not exceed 55%, more preferably it does not exceed 50%, even more preferably it does not exceed 45% by mole.

In addition to recurring units derived from at least one monomer (FM) and from at least one monomer (IO) polymer (F) further comprises recurring units derived from at least one monomer (Az).

Polymer (F) comprises from 0.01% to 10% by mole of recurring units derived from at least one monomer comprising an azide group [monomer (Az)].

The skilled in the art will select the appropriate concentration of recurring units derived from monomer (Az) in view of the cross-linking density required in the target field of use of polymer (F). It is nevertheless understood that appropriate cross-linking densities are advantageously obtained when the amount of recurring units derived from monomer (Az) is preferably of at least 0.05%, more preferably of at least 0.1% by mole, with respect to the total moles of recurring units of polymer (F). Generally the amount of recurring units derived from monomer (Az) does not exceed 9%, preferably it does not exceed 7% by mole.

Monomer (Az) generally complies with formula (I) herein below:

$$CX_1X_2=CX-(CX_3X_4)_t-(O)_p-R_f-(CH_2)_n-[S(O)_q]_sN_3 \quad (I)$$

wherein: $X$, $X_1$, $X_2$, $X_3$ and $X_4$ equal to or different from each other, are independently H or F, t is 0 or 1, p is 0 or 1, n is an integer from 0 to 4, s is 0 or 1, q is 1 or 2, and $R_f$ is a divalent fluorocarbon group, possibly interrupted by one or more ethereal oxygen atoms.

Preferred compounds of formula (I) are those wherein, when p is 1, t is also 1.

According to a first embodiment, in formula (I) t=0 and p=1, that is to say that monomer (Az) is a vinyl ether monomer of formula (II):

$$CX_1X_2=CX-O-R_f-(CH_2)_n-[S(O)_q]_sN_3 \quad (II)$$

wherein: $X$, $X_1$ and $X_2$, equal to or different from each other, are independently H or F, n is an integer from 0 to 4, s is 0 or 1, q is 1 or 2, and $R_f$ is a divalent fluorocarbon group, possibly interrupted by one or more ethereal oxygen atoms.

According to a variant of this first embodiment, the azide group of formula (II) is a sulfonazide group wherein q=2 and s=1, that is to say that monomer (Az) is a sulfonazide monomer of formula (III):

$$CX'_1X'_2=CX'-O-R'_f-(CH_2)_{n'}-SO_2N_3 \quad (III)$$

wherein: $X'$, $X'_1$ and $X'_2$, equal to or different from each other, are independently H or F, preferably F, n' is an integer from 0 to 4, preferably n'=0, and $R'_f$ is a perfluoroalkyl group, possibly comprising one or more ethereal oxygen atoms.

Preferred sulfonazide monomers of this embodiment are perfluorovinylethers derivatives of formulae: $CF_2=CF-O-CF_2-CF(CF_3)-O-CF_2CF_2-SO_2N_3$, $CF_2=CF-O-CF_2CF_2-SO_2N_3$, $CF_2=CF-O-CF_2CF_2CF_2-SO_2N_3$, $CF_2=CF-O-CF_2CF_2CF_2CF_2-SO_2N_3$.

These monomers can be manufactured from corresponding sulfonyl fluoride monomers by nucleophilic displacement of fluorine with an azide (typically NaN₃).

According to a second embodiment, in formula (I) t=0 and p=0, that is to say that monomer (Az) is a monomer of formula (IV):

$$CX''_1X''_2=CX''-R''_f-(CH_2)_{n''}-[S(O)_{q''}]_{s''}N_3 \quad (IV)$$

wherein: $X''$, $X''_1$ and $X''_2$, equal to or different from each other, are independently H or F, n" is an integer from 0 to 4, s" is 0 or 1, q" is 1 or 2, and $R''_f$ is a divalent fluorocarbon group, possibly interrupted by one or more ethereal oxygen atoms, wherein the $sp^2$ hybridized carbon atom of the terminal double bond =CX"— is bound to a $sp^3$ carbon atom of the $R''_f$ group.

According to a first variant of this second embodiment, the azide group of formula (IV) is a sulfonazide group wherein q=2 and s=1, that is to say that monomer (Az) complies with formula (V):

$$CX''_1X''_2=CX''-R''_f-(CH_2)_{n''}-SO_2N_3 \quad (V)$$

wherein: $X''$, $X''_1$ and $X''_2$, equal to or different from each other, are independently H or F, n" is an integer from 0 to 4, and $R''_f$ is a divalent fluorocarbon group, possibly interrupted by one or more ethereal oxygen atoms, wherein the $sp^2$ hybridized carbon atom of the terminal double bond =CX"— is bound to a $sp^3$ carbon atom of the $R''_f$ group.

According to certain embodiments of this first variant, n" in formula (V) is zero, that is to say that monomer (Az) advantageously complies with formula (VI):

$$CX''_1X''_2=CX''-R^*_f-SO_2N_3 \quad (VI)$$

wherein: $X''$, $X''_1$ and $X''_2$, equal to or different from each other, are independently H or F, $R^*_f$ is a divalent perfluoroalkyl group, possibly interrupted by one or more ethereal oxygen atoms, preferably of formula $-(CF_2)_{m''}-$, with m" being an integer from 1 to 12, preferably 2, 4, 6, 8, 10, or 12, more preferably 4 or 6.

Non limiting examples of monomers (Az) complying with formula (VI) here above are compounds of formula (VII):

$$CH_2=CH-(CF_2CF_2)_{m°}-SO_2N_3 \quad (VII)$$

with m° being an integer from 1 to 6, preferably 2 or 3.

Compounds of formula (VII) can be easily manufactured from corresponding di-iodo precursors of formula $I-(CF_2CF_2)_{m°}-I$, by selective addition of ethylene on one chain end, selective dehydroiodination, and subsequent functionalization at the remainder chain end to provide the sulphonazide group.

According to other embodiments of this first variant, n" in formula (V) is an integer different from zero, that is to say that monomer (Az) advantageously complies with formula (VIII):

$$CX''_1X''_2=CX''-R^*_f-(CH_2)_{n^*}-SO_2N_3 \quad (VIII)$$

wherein: $X''$, $X''_1$ and $X''_2$, equal to or different from each other, are independently H or F, n* is an integer from 1 to 4, preferably 2 or 4, more preferably n* is 2; $R^*_f$ is a divalent perfluoroalkyl group, possibly interrupted by one or more ethereal oxygen atoms, preferably of formula $-(CF_2)_{m''}-$, with m" being an integer from 1 to 12, preferably 2, 4, 6, 8, 10, or 12, more preferably 4 or 6.

Non limiting examples of monomers (Az) complying with formula (VIII) here above are compounds of formula (IX):

$$CH_2=CH-(CF_2CF_2)_{m1}-(CH_2CH_2)_{n1}-SO_2N_3 \quad (IX)$$

with m1 being an integer from 1 to 6, preferably 2 or 3, and n1 being an integer from 1 to 3, preferably 1.

Compounds of formula (IX) can be easily manufactured from corresponding di-iodo precursors of formula $I-(CF_2CF_2)_{m1}-I$, by insertion/addition of ethylene in iodine-carbon bonds, partial dehydroiodination and subsequent functionalization at the remainder $-CH_2$, $CH_2-I$ chain end to provide the sulphonazide group.

According to additional embodiments of this first variant, the group $-R''_f-$ in formula (V) is a group of formula $-CF_2-O-R^a_f-$, that is to say that the monomer (Az) complies with formula (X):

$$CX^a_1X^a_2=CX^a-CF_2-O-R^a_f-(CH_2)_{na}-SO_2N_3 \quad (X)$$

wherein: $X^a$, $X^a_1$ and $X^a_2$, equal to or different from each other, are independently H or F, preferably all are equal to F, na is an integer from 0 to 4, preferably na=0 and $-R^a_f-$ is a divalent perfluoroalkyl group having 1 to 6 carbon atoms, preferably $-CF_2CF_2-$.

Non limiting examples of monomers (Az) complying with formula (X) here above are compounds of formula (XI):

$$CF_2=CF-CF_2O-CF_2CF_2-SO_2N_3 \quad (XI).$$

Compounds of formula (XI) can be manufactured by reaction of fluoroallylfluorosulfate with FCO—CF$_2$—SO$_2$F to yield CF$_2$=CF—CF$_2$O—CF$_2$—CF$_2$—SO$_2$F and subsequent nucleophilic substitution with an azide salt (typically NaN$_3$).

According to a second variant of this second embodiment, in formula (IV) s''=0, that is to say that monomer (Az) complies with formula (XII):

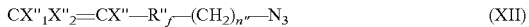
(XII)

wherein: X'', X''$_1$ and X''$_2$, equal to or different from each other, are independently H or F, n'' is an integer from 0 to 4, R''$_f$ is a divalent fluorocarbon group, possibly interrupted by one or more ethereal oxygen atoms, wherein the sp$^2$ hybridized carbon atom of the terminal double bond =CX''— is bound to a sp$^3$ carbon atom of the R''$_f$ group.

According to certain embodiments of this second variant, n'' in formula (XII) is zero, that is to say that monomer (Az) advantageously complies with formula (XIII):

(XIII)

wherein: X'', X''$_1$ and X''$_2$, equal to or different from each other, are independently H or F, R*$_f$ is a divalent perfluoroalkyl group, possibly interrupted by one or more ethereal oxygen atoms, preferably of formula —(CF$_2$)$_{m''}$—, with m'' being an integer from 1 to 12, preferably 2, 4, 6, 8, 10, or 12, more preferably 4 or 6.

Non limiting examples of monomers (Az) complying with formula (XIII) here above are compounds of formula (XIV):

CH$_2$=CH—(CF$_2$CF$_2$)$_{m°}$—N$_3$ (XIV)

with m° being an integer from 1 to 6, preferably 2 or 3.

Compounds of formula (XIV) can be easily manufactured from corresponding di-iodo precursors of formula I—(CF$_2$CF$_2$)$_{m°}$—I, by selective addition of ethylene on one chain end, selective dehydroiodination, and subsequent nucleophilic substitution at the remainder chain end to provide the azide group.

According to other embodiments of this second variant, n'' in formula (V) is an integer different from zero, that is to say that monomer (Az) advantageously complies with formula (XV):

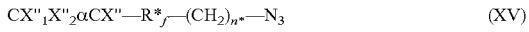
(XV)

wherein: X'', X''$_1$ and X''$_2$, equal to or different from each other, are independently H or F, n* is an integer from 1 to 4, preferably 2 or 4, more preferably n* is 2; R*$_f$ is a divalent perfluoroalkyl group, possibly interrupted by one or more ethereal oxygen atoms, preferably of formula —(CF$_2$)$_{m''}$—, with m'' being an integer from 1 to 12, preferably 2, 4, 6, 8, 10, or 12, more preferably 4 or 6.

Non limiting examples of monomers (Az) complying with formula (XV) here above are compounds of formula (XVI):

CH$_2$=CH—(CF$_2$CF$_2$)$_{m1}$—(CH$_2$CH$_2$)$_{n1}$—N$_3$ (XVI)

with m1 being an integer from 1 to 6, preferably 2 or 3, and n1 being an integer from 1 to 3, preferably 1.

Compounds of formula (XVI) can be easily manufactured from corresponding di-iodo precursors of formula I—(CF$_2$CF$_2$)$_{m1}$—I, by insertion/addition of ethylene in iodine-carbon bonds, partial dehydroiodination and subsequent nucleophilic substitution at the remainder —CH$_2$CH$_2$—I chain end to provide the sulphonazide group.

According to a third embodiment, in formula (I) t=p=s=1, n=0 and q is 2, that is to say that monomer (Az) is a sulfonyl azide allylic monomer of formula (XVII):

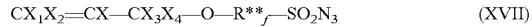
CX$_1$X$_2$=CX—CX$_3$X$_4$—O—R**$_f$—SO$_2$N$_3$ (XVII)

wherein: X, X$_1$, X$_2$, X$_3$ and X$_4$, equal to or different from each other, are independently H or F, preferably all are equal to F, R**$_f$ is a divalent fluorinated group, optionally comprising one or more than one ethereal oxygen atom.

In a preferred aspect of this third embodiment monomer (Az) complies with formula (XVIII):

CF$_2$=CF—CF$_2$—O—R$_f$**—SO$_2$N$_3$ (XVIII)

wherein R**$_f$ is a divalent fluorinated group, optionally comprising one or more than one ethereal oxygen atom.

In formulae (XVII) or (XVIII) group R$_f$ is preferably a group of formula —CF$_2$—R$_f$*—, with the —CF$_2$— group being bound to the ethereal oxygen depicted in formulae (XVII) or (XVIII) and the R$_f$*** group being bound to the sulfonazide group, as depicted in formula (XIX):

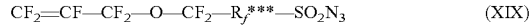
CF$_2$=CF—CF$_2$—O—CF$_2$—R$_f$***—SO$_2$N$_3$ (XIX)

wherein R$_f$*** is a divalent C$_1$-C$_{12}$ fluorinated group, optionally comprising one or more than one ethereal oxygen atom.

Most preferably, monomer (Az) complies with formula (XX) herein below:

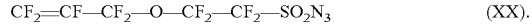
CF$_2$=CF—CF$_2$—O—CF$_2$—CF$_2$—SO$_2$N$_3$ (XX).

Sulfonyl azide allylic monomers of formula (XVIII) may be conveniently prepared by reaction of a fluorosulfonic precursor of formula (XXI):

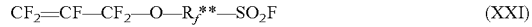
CF$_2$=CF—CF$_2$—O—R$_f$**—SO$_2$F (XXI)

wherein R$_f$** is as defined above, with an azide salt as described in European application No. EP 11194148.0 filed on Dec. 16, 2011.

Another object of the present invention is a process for the manufacture of the polymer (F) as defined above, said process comprising polymerizing a monomer mixture comprising at least one monomer (FM), at least one monomer (IO) and at least one monomer (Az), as above detailed.

Polymer (F) may be prepared by any polymerization process known in the art. Suitable processes for the preparation of such polymers are for instance those described in U.S. Pat. No. 4,940,525 (THE DOW CHEMICAL COMPANY) 10 Jul. 1990, EP 1323751 A (SOLVAY SOLEXIS SPA) 2 Jul. 2003, EP 1172382 A (SOLVAY SOLEXIS SPA) 16 Nov. 2002.

Polymer (F) can be manufactured either by an aqueous suspension polymerization process or by an aqueous emulsion polymerization process.

Polymer (F) is preferably manufactured by an aqueous emulsion polymerization process, said process comprising polymerizing at least one monomer (FM), at least one monomer (IO) and at least one monomer (Az) as described above in the presence of at least one radical initiator in a polymerization medium comprising:
water,
at least one fluorinated surfactant, and, optionally,
at least one non-functional perfluoropolyether oil.

Suitable surfactants for the process of the present invention are for instance anionic fluorinated surfactants, for example salts of fluorinated carboxylic acids or of sulphonic acids, having a perfluoro-polyether or perfluorocarbon structure or partially fluorinated, cationic surfactant, for example quaternary ammonium fluorinated salts, or even fluorinated non ionic surfactants. The above surfactants can be also used in mixtures.

Non limiting examples of surfactants having a perfluorocarbon structure are for instance ammonium or alkaline metal salts of $C_8$-$C_{10}$ perfluorcarboxylic acids or perfluorooxycarboxylates of formula $R_sO$—$CF_2$, $CF_2$—O—$CF_2$—$COOX_a$ wherein $R_s$ is a perfluoro(oxy)alkyl group, and $X_a$ is H, a monovalent metal or an ammonium group of formula $NR^N_4$, with $R^N$ equal or different at each occurrence, being H or a $C_{1-6}$ hydrocarbon group.

Non limiting examples of surfactants having a perfluoropolyether structure are for instance selected from those with formula $F_2ClO(CF_2CF(CF_3)O)_p(CF_2O)_qCF_2COOR'$ wherein R'=H, Na, K, $NH_4$, p/q=10. Generally these fluorinated surfactant(s) have an average molecular weight in the range 500-700.

The polymerization system may optionally comprise small amounts of auxiliaries such as buffers, complexformers, chain transfer agents or perfluoropolyether oils such as those used in microemulsion processes, for instance those having formula $CF_3O(CF_2$—$CF(CF_3)O)_l(CF_2O)_kCF_3$ wherein l/k=20 (average molecular weight in the range 400-600) which are commercially available from Solvay Specialty Polymers Italy SpA under the trade name Galden® D02.

The polymerization can be carried out at any suitable pH, pH is typically not critical but depends on the initiator system used. To avoid the conversion of the sulfonyl fluoride group in the monomer(s) of type (IO) into the ionic form during polymerization, the pH is typically equal to or lower than 7, more typically equal to or lower than 6.

Any initiator or initiator system suitable for free radical polymerization may be used in the process of the present invention. Non limiting examples of suitable free radical initiators are for instance organic initiators selected among bis(fluoroacyl)peroxides, bis(chlorofluoroacyl)peroxides, dialkyl peroxydicarbonates, diacyl peroxides, peroxyesters, azo compounds or inorganic initiators such as ammonium and/or potassium and/or sodium persulphate, optionally in combination with ferrous, cupreous or silver salts or a redox system such as ammonium persulphate/disulfite and potassium permanganate. Preferably the free radical initiator used in the process of the present invention is an inorganic initiator soluble in the aqueous phase, more preferably ammonium and/or potassium and/or sodium persulphate.

Polymerization pressure ranges typically between 3 and 40 bar, preferably between 5 and 30 bar, more preferably between 5 and 15 bar.

The skilled in the art will choose the polymerization temperature having regards, inter alia, of the radical initiator used. Polymerization temperature is generally selected in the range comprised between 40° C. and 100° C., preferably between 50° C. and 80° C.

The polymerization process of the invention typically results in an aqueous latex comprising the polymer (F) as defined above and at least one fluorinated surfactant as defined above.

The amount of polymer (F) as defined above in the latex directly resulting from the polymerization process typically ranges between 10% and 40% by weight, preferably between 20% and 30% by weight.

Polymer (F) may be isolated and dried by any known technique, with the proviso that the drying temperature does not cause cross-linking.

Alternatively, an aqueous dispersion emerging from the reactor may be used directly as-is, for example as a coating composition, or it may first be stabilized by addition of surfactant and/or concentrated by processes well known in the art for the preparation of latex coating compositions.

Polymers (F) of this invention may be mixed with other ingredients, and the resulting cross-linkable composition [composition (CC)], which is another object of the present invention, can submitted to cross-linking to yield a cured article.

The term "cross-link" is used in the present specification to refer to a covalent chemical bond bridging one polymer chain to another and the term "cross-linking" is used herein to refer to a process of chemically joining two or more polymer molecules by cross-links.

A "cross-linking agent" is defined herein as a substance that, added to a polymer and/or polymer composition promotes cross-linking.

The cross-linkable composition comprising the polymer (F) as above detailed may additionally comprise at least one cross-linking agent. While polymer (F) may undergo self-cross-linking, i.e. can be cured in the absence of any additional co-agent, the use of a cross-linking agent might be advantageous in certain applications.

Curing agents, when used in combination with polymer (F) in the cross-linking process of the invention, are used in amounts generally of between 0.5% and 10% by weight and preferably between 1% and 7% by weight relative to the polymer (F).

Among these cross-linking agents, the following may be used:
polyallyl derivatives comprising more than one ethylenically unsaturated allylic double bond, including triallyl cyanurate; triallyl isocyanurate (TAIC); tris(diallylamine)-s-triazine; triallyl phosphite; N,N-diallylacrylamide; N,N,N',N'-tetraallylmalonamide;
polyvinyl derivatives comprising more than one ethylenically unsaturated vinyl double bond, including trivinyl isocyanurate; 2,4,6-trivinyl methyltrisiloxane;
bis-olefin [bis-olefin (OF)] having general formula:

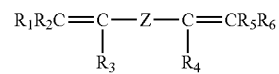

wherein $R_1$, $R_2$, $R_3$, $R_4$, $R_5$ and $R_6$, equal or different from each other, are H or $C_1$-$C_5$ alkyl; Z is a group of formula —$(O)_{e1}$-E-$(O)_{e2}$—, wherein e1 and e2, equal to or different from each other are independently 1 or 0, and E is a divalent $C_1$-$C_{18}$ group, optionally containing oxygen atoms, preferably at least partially fluorinated, like notably a (per)fluoropolyoxyalkylene radical, e.g. as described in EP 661304 A (AUSIMONT SPA) 5 Jul. 1995;
triazines substituted with ethylenically unsaturated groups, such as notably those described in EP 860436 A (AUSIMONT SPA) 26 Aug. 1998 and WO 97/05122 (DU PONT) 13 Feb. 1997;
polyazides compounds comprising more than one azide groups, including notably diazides of formula:

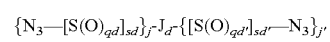

wherein each of j an j', equal to or different from each other, is 0 or an integer of 1 to 3, provided that j+j' is of at least 2, each of sd and sd', equal to or different from each other is independently 0 or 1, each of qd and qd', equal to or different from each other is independently 1 or 2, and $J_d$ is a (hydro)(fluoro)carbon group, optionally containing oxygen atoms, preferably at least partially fluorinated [agent (Cz)].

The bis-olefin (OF) is preferably selected from the group consisting of those complying with formulae (OF-1), (OF-2) and (OF-3):

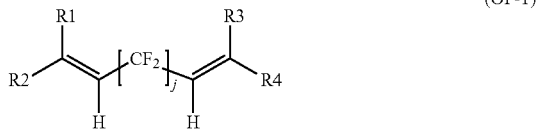
(OF-1)

wherein j is an integer between 2 and 10, preferably between 4 and 8, and R1, R2, R3, R4, equal or different from each other, are H, F or $C_{1-5}$ alkyl or (per)fluoroalkyl group;

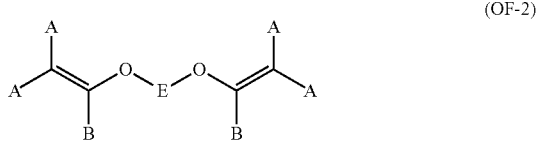
(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$.

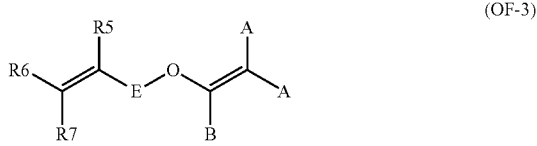
(OF-3)

wherein E, A and B have the same meaning as above defined; $R_5$, $R_6$, $R_7$, equal or different from each other, are H, F or $C_{1-5}$ alkyl or (per)fluoroalkyl group.

The agent (Cz) is preferably a fluorinated polyazide of formula:

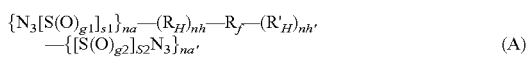
(A)

wherein each of g1 and g2, equal to or different from each other, is 1 or 2, each of s1 and s2, equal to or different from each other, is 0 or 1, each of na and na' is independently zero or an integer of 1 to 3, provided that the sum na+na' is at least 2, each of $R_H$ and $R'_H$, equal to or different from each other, is a $C_1$-$C_{12}$ hydrocarbon group free of fluorine atoms, nh and nh', equal to or different from each other are independently 0 or 1, and $R_f$ is selected from the group consisting of i) a $C_3$-$C_{20}$ fluorocarbon group, possibly comprising one or more ethereal oxygen atoms, ii) an oligomer comprising copolymerized units of vinylidene fluoride and trifluoroethylene.

According to a first embodiment, the agent (Cz) advantageously complies with formula (B) herein below:

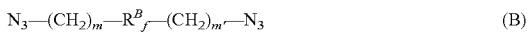
(B)

wherein each of m and m' is independently an integer of 1 to 6, and $R^B_f$ is a $C_3$-$C_{10}$ fluorocarbon group, possibly comprising one or more ethereal oxygen atoms.

The agent (Cz) of this first embodiment complies preferably with formula (C) herein below:

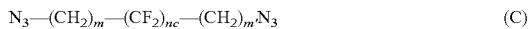
(C)

wherein each of m and m' is independently an integer of 1 to 6, preferably m and m'=2, and nc is an integer of 4 to 10, preferably of 4 to 8.

Non limiting examples of agent (Cz) according to this variant are notably those of formula: $N_3-(CH_2)_2-(CF_2)_2-(CH_2)_2-N_3$, $N_3-(CH_2)_2-(CF_2)_4-(CH_2)_2-N_3$, $N_3-(CH_2)_2-(CF_2)_6-(CH_2)_2-N_3$, $N_3-(CH_2)_2-(CF_2)_8-(CH_2)_2-N_3$, $N_3-(CH_2)_2-(CF_2)_{10}-(CH_2)_2-N_3$.

Compounds of formula (C) can be manufactured by telomerisation of tetrafluoroethylene in the presence of iodine, followed by ethylene addition/incorporation onto C—I bonds, and subsequent nucleophilic displacement of iodine by an azide salt, preferably $NaN_3$.

According to a second embodiment, the agent (Cz) advantageously complies with formula (D) herein below:

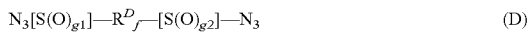
(D)

wherein each of g1 and g2, equal to or different from each other, is 1 or 2, and $R^D_f$ is a $C_3$-$C_{20}$ fluoroalkyl group, possibly comprising one or more ethereal oxygen atoms.

Preferably, the agent (Cz) of this second embodiment complies with formula (E) herein below:

(E)

wherein $R^E_f$ is a $C_3$-$C_{20}$ fluoroalkyl group, possibly comprising one or more ethereal oxygen atoms.

Non limiting examples of agent (Cz) according to this variant are notably those of formula: $N_3SO_2-C_4F_8-SO_2N_3$, $N_3SO_2-(CF_2)_2-O-C_4F_8-O-(CF_2)_2-SO_2N_3$, $N_3SO_2-(CF_2)_2-O-CF(CF_3)CF_2O-C_4F_8-O-CF_2-CF(CF_3)O-(CF_2)_2-SO_2N_3$, $N_3SO_2-(CF_2)_2-O-CF_2CF(CF_3)O-C_4F_8-O-CF_2-CF(CF_3)O-(CF_2)_2-SO_2N_3$, $N_3SO_2-(CF_2)_2-O-CF_2CF(CF_3)O-C_4F_8-O-CF(CF_3)-CF_2O-(CF_2)_2-SO_2N_3$. Group of formula —O—$C_4F_8$—O— in each of the above can be any of —O—$(CF_2CF_2)_2$—O—, —O—$CF_2CF_2$—$CF(CF_3)$—O—, —O—$CF(CF_3)$—$CF(CF_3)$—O—.

Compounds of formula (E) can be manufactured by fluorine assisted dimerization fo sulfonyl monomers, e.g. of formulae $CF_2=CF-SO_2F$, $CF_2=CF-O-CF_2CF_2SO_2F$, $CF_2=CF-O-CF(CF_3)CF_2OCF_2CF_2SO_2F$, $CF_2=CF-O-CF_2CF(CF_3)OCF_2CF_2SO_2F$, followed by nucleophilic displacement at the fluorosulfonyl group by reaction with an azide salt.

Among above mentioned curing coagents, bis-azides, TAIC, agents (Cz) and bis-olefins (OF), as above detailed, have been found to provide particularly good results; most preferably, agents (Cz) have been found to provide particularly good results.

A further object of the present invention is a method of cross-linking the polymer (F) and/or the composition (CC) as above detailed, to provide a cross-linked article.

Cross-linking of polymer (F) and/or of the composition (CC) of this invention may comprise exposing polymer (F) to UV radiation and/or to thermal treatment.

In a first embodiment, cross-linking comprises exposing polymer (F) and/or the composition (CC) to UV radiation.

The term UV radiation is intended to denote, to the purpose of the invention, electromagnetic radiation with a wavelength shorter than that of visible light, but longer than soft X-rays. It can be subdivided into near UV (380-200 nm wavelength; abbreviation: NUV), far or vacuum UV (200-10 nm; abbreviation: FUV or VUV), and extreme UV (1-31 nm; abbreviation: EUV or XUV). NUV having wavelength from 200 to 380 nm is preferred in the process of the invention. Either monochromatic or polychromatic radiation can be used.

UV radiation can be provided in the cross-linking process of the invention by any suitable UV radiation source. Preferred UV radiation source for the process of the invention is mercury light. It is known that a significant portion of the energy radiated from excited mercury vapours is in the ultra-violet part of the spectrum. In the case of the low pressure discharge, more than half of the total energy supplied is radiated in the short-wave UV region at 253.7 nm. High pressure lamps radiate about 10% of their energy in the long-wave UV region at 365.0 nm, but an appreciable amount is also radiated at shorter wavelengths.

In a second, preferred, embodiment cross-linking comprises exposing polymer (F) and/or of the composition (CC) to thermal treatment.

The person skilled in the art will select the temperature most suitable for promoting the cross-linking of polymer (F) based on the nature of monomer (Az). Typically the temperature is at least 90° C., preferably at least 100° C. In general the temperature for promoting cross-linking of polymer (F) does not exceed 180° C.

The cross-linking process of the present invention can be used for manufacturing articles comprising cross-linked polymer (F).

The articles can be notably sheets and films, including thin films, and/or assemblies of the same.

The articles of the invention can be useful notably in different electrochemical devices as well as in filtration devices.

Typically the process for the preparation of articles comprising cross-linked polymer (F) comprises the use of a liquid composition of polymer (F) in a suitable solvent.

Suitable solvents may be selected from the group consisting of perfluorocarbons, hydrofluorocarbons, hydrofluoroethers, hydrofluoropolyethers and perfluoropolyethers.

Suitable perfluorocarbons and hydrofluorocarbons are for instance cyclic and non-cyclic alkanes having from 3 to 20 carbon atoms. In the hydrofluorocarbons the number of fluorine atoms preferably exceeds the number of hydrogen atoms.

Suitable hydrofluoropolyethers are for instance those available from Solvay Specialty Polymers Italy SpA under the tradenames H-GALDEN® ZT 60, H-GALDEN® ZT 85, H-GALDEN® ZT 100, H-GALDEN® ZT 130, H-GALDEN® ZT 150, H-GALDEN® ZT 180 or other low boiling solvents.

Non limiting examples of perfluoropolyethers are those available from Solvay Specialty Polymers Italy SpA under the tradenames GALDEN® HT 110, GALDEN® HT 135, GALDEN® HT 170, GALDEN® SV 80.

In a first embodiment the process for making an article comprising cross-linked polymer (F) of the invention comprises the steps of:
  a) preparing a liquid composition comprising polymer (F) or composition (CC);
  b) applying the liquid composition obtained in step a) onto a substrate;
  c) submitting polymer (F) or composition (CC) with UV radiation and/or thermal treatment to promote cross-linking of polymer (F); and, optionally,
  d) hydrolising polymer (F) to convert the —$SO_2F$ groups to sulfonic acid groups —$SO_3X$, wherein X is H, $NH_4^+$ or an alkaline metal cation $M^+$.

The liquid composition comprising polymer (F) or composition (CC) may optionally comprise additional ingredients. Mention can be made of non-ionic surfactants like TRITON® surfactant, TERGITOL® surfactant; as well as thermoplastic fluorinated polymers, typically having film-forming properties. Among thermoplastic fluorinated polymers which can be used in combination with polymer (F) in the liquid composition, mention can be made of PFA, ETFE, PCTFE, PDVF, ECTFE, and the like.

In step b) of the process the liquid composition comprising polymer (F) or composition (CC) is applied onto a substrate.

Any conventional method known in the art, such as impregnation, casting, coating, e.g. roller coating, gravure coating, reverse roll coating, dip coating, spray coating and the like may be used to carry out step b).

The liquid composition may be cast over an inert, non porous, support in a film-forming layer which, after the reaction with the cross-linking agent and usually a drying step, is removed from the support providing an article, typically in the form of a film, consisting of the cross-linked polymer. Common supports are for instance a plate, a belt or a fabric, made of glass, metal or polymeric material from which the film of the cross-linked polymer may be removed.

Alternatively, the process may be used for the preparation of composite articles, that is articles comprising a support, preferably a porous support, in addition to the cross-linked polymer. Notable examples of composite articles are for instance composite membranes, fabrics, fibres. Composite membranes can be used both as ion conducting membranes in electrolytic cells or as membranes for filtration or ultra-filtration applications. The term "membrane" is used herein in its usual meaning to indicate a discrete, generally thin, interface that moderates the permeation of chemical species in contact with it.

Said composite articles may be prepared by casting or coating the liquid composition over a suitable porous support. Alternatively they may be prepared with the liquid composition with an impregnation process.

Such an impregnation process comprises the step of impregnating a porous support with the liquid composition comprising polymer (F) or composition (CC).

The choice of the porous support is not particularly limited. Porous supports which are generally inert at the conditions of use of the composite article will generally be preferred.

Among porous inert materials suitable for the preparation of the composite article mention can be made of fabrics, fibers, inorganic materials, woven or non-woven polyolefin membranes, and fluorinated polymer porous supports.

When the article is an ion conducting or filtration membrane, porous supports of fluorinated polymers are generally preferred because of their high chemical inertia. Biaxially expanded PTFE porous supports (otherwise known as ePTFE membranes) are among preferred supports. These supports are notably commercially available under trade names GORE-TEX®, TETRATEX®.

Impregnation can be carried out by immersion of the porous support into an impregnation vessel comprising the liquid composition or it can be performed by applying suitable amounts of the same by well-known coating techniques such as casting, coating, spraying, brushing and the like, either simultaneously on each side of the porous support or in subsequent coating steps. It is nevertheless generally understood that impregnation by immersion in a vessel comprising the liquid composition is the technique having provided best results.

The process also typically comprises at least one drying step. The drying step is typically intended to remove excess liquid medium from the film of polymer (F) or composition (CC). This step is may be carried out at a temperature lower than the temperature suitable to promote the cross-linking of polymer (F), typically at a temperature from 20 to 80° C., preferably from 25 to 80° C., more preferably from 30 to 80° C. Alternatively, the drying step may be carried out at a temperature suitable for promoting the cross-linking, thus at a temperature of at least 90° C.

The process may additionally comprise an annealing step. The annealing step, typically conceived for consolidating the film of polymer (F), is generally carried out at a temperature of at least 150° C., preferably of at least 170° C., more preferably of at least 180° C., and even more preferably of at least 200° C. Maximum temperature is not particularly limited, provided that polymer (F), and the support when present, remain stable under these conditions. Generally the annealing step is carried out at a temperature not exceeding 300° C., preferably not exceeding 270° C., more preferably not exceeding 250° C.

Step c) of the process, i.e. the cross-linking of polymer (F), may conveniently be carried out at the same time as the annealing step.

To provide the article comprising cross-linked polymer (F) with hydrophilic character and/or ion conduction properties the sulfonyl fluoride —$SO_2F$ groups in the recurring units derived from monomer (IO) need to be hydrolysed to the ionic sulfonic acid groups —$SO_3X$.

Hydrolysis of polymer (F) is typically conducted in a two-step process, whereby polymer (F) is first converted into the salified form, —$SO_3M$ wherein M is a cation selected among $NH_4^+$, $K^+$, $Li^+$, $Na^+$, or their mixtures, by treatment of polymer (F) with a strong base (e.g. NaOH, KOH) according to known methods. In a second step the salified form of the polymer is converted to the corresponding acid form by treatment with a concentrated acid solution.

Thus, the invention is also directed to an article comprising a cross-linked polymer (F).

The article may be a film consisting of the cross-linked polymer (F). Alternatively, the article may be a fabric or a fibre to which the cross-linked polymer (F) provides hydrophilic properties. Preferably the article is an ion conducting membrane or a filtration membrane. More preferably the article is an ion conducting membrane.

In a preferred embodiment, the membrane comprises:
a porous support (as above detailed); and,
a cross-linked fluorinated polymer (F) as above defined impregnated on the support.

The ion conducting membranes of the invention, in particular composite membranes, are useful as ion exchange membranes in electrochemical applications. The Applicant has found that said ion conducting membranes are provided with a higher stability under the conditions of use of the electrochemical cell with respect to membranes obtained using non cross-linked fluorinated polymers.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Synthesis of $CF_2$=$CFCF_2OCF_2CF_2SO_2N_3$ [monomer (Az1)]

The precursor $FSO_2CF_2CF_2OCF_2CF$=$CF_2$ was prepared according to methods described in the literature (WLASSICS, I., et al. Perfluoro Allyl Sulfate (FAFS): a Versatile Buildng Block For New Fluoroallylic Compounds. *Molecules*. 2011, vol. 16, p. 6512_6540.).

In a glass cylindrical jacketed reactor, with three inlets, 15.15 mmoles=5.00 g of $FSO_2CF_2CF_2OCF_2CF$=$CF_2$ were introduced, in combination with 90 µl of a phase transfer agent commercially available as Aliquat ($CH_3$—N —[($CH_2$)$_7CH_3$]$_3^+Cl$—), corresponding to 1% v/v. The solution so obtained was cooled at 15° C. using a cryostat connected to the reactor jacket. Using an automatic dispensing syringe containing a solution made of 7.5 ml of distilled $H_2O$ and 2.395 g=36.85 mmoles of $NaN_3$, said solution was added dropwise at a rate of 0.1 eq. $NaN_3$/h; reactor temperature was kept at 15° C. during the whole addition time (about 24 hours). Temperature was then raised to 20° C. for further 8 hours. At the end of the reaction, the reaction mixture was composed of two phases. Upper phase, composed of $H_2O$, NaF and residual $NaN_3$ was discarded. Lower phase was recovered and centrifuged at 15° C. and 4000 rpm during 20 minutes so as to eliminate solid particulate residues. Colourless and clear oil was obtained. Yield (after purification and separation)=65% moles.

Selectivity=55/45    A/B-A=$^{a,b}CF_2$=$^cCF^dCF_2O^eCF_2^f$ $CF_2SO_2N_3$;B=$N_3^gCF_2^hCFH^iCF_2$ $O^lCF_2^mCF_2SO_2N_3$ $^{19}$F-NMR; ($CDCl_3$; ppm): a: −89; b: −102; c: −185.4; d: −72.3; e: −79.3 (AB); f: −109.3; g: −78→−82 (m); h: −206 ($J^1_{H,F}$=48 hz); i: −74.5; →−83; l: −79.3 (AB); m: −109.3.

FT-IR (KBr; cm$^{-1}$): 1792 ($CF_2$=$CF$—$CF_2$ st.); 2163 (-$N_3$ st.); 1464+1384 (—$SO_2$—$N_3$ st.); 1200–1100 (CF st.).

Example 1

Polymerization of tetrafluoroethylene (TFE) and perfluoro-5-sulfonylfluoride-3-oxa-1-pentene(SFVE) in the presence of monomer (Az1) (2.5% by moles)

In a 5 L autoclave the following reagents were charged:
2.6 L of demineralised water;
145 g of the monomer with formula: $CF_2$=$CF$—O—$CF_2CF_2$—$SO_2F$ (SFVE)
720 g of a 5 wt % aqueous solution of $CF_2ClO(CF_2CF(CF_3)O)_n(CF_2O)_mCF_2COOK$ (avg. MW=521, ratio n/m=10);
25 ml of a solution containing the monomer Az1 $CF_2$=$CFCF_2OCF_2CF_2SO_2N_3$ dissolved in Galden® PFPE D02 (concentration: 1M)

The autoclave, stirred at 650 rpm, was heated at 55° C. A water based solution with 27 g/L of potassium persulfate was added in a quantity of 66 mL. The pressure was maintained at a value of 8 bar (abs.) by feeding tetrafluoroethylene (TFE).

After adding 40 g of tetrafluoroethylene in the reactor, 40 g of the monomer SFVE and 15 ml of monomer Az1 dissolved in Galden® PFPE D02 were added every 40 g of TFE fed to the autoclave.

The reaction was stopped after 300 min by stopping the stirring, cooling the autoclave and reducing the internal pressure by venting the TFE; a total of 800 g of TFE was fed into the autoclave.

The latex was then coagulated by freezing and thawing and the recovered polymer was washed with water and dried at 80° C. for 48 hours.

Equivalent weight (EW) of the polymer was determined by FTIR according to known methods and found to be 741 g/eq.

Comparative Example 1

Polymerization of tetrafluoroethylene and perfluoro-5-sulfonylfluoride-3-oxa-1-pentene(SFVE)

A TFE/SFVE copolymer having an equivalent weight of 751 g/eq was prepared following the experimental conditions of Example 1.

Cross-Linking of Copolymer TFE/SFVE/Az1 of Example 1

Powder samples of the TFE/SFVE/Az1 copolymer obtained in Example 1 were submitted to cross-linking via thermal treatment.

Thermal treatment consisted in maintaining samples of polymer powders in a ventilated oven at a temperature of about 120 to 150° C.

In order to verify if the polymer sample was cross-linked melt flow rate of the polymer was determined following the procedure of ASTM D1238-04 at a temperature of 250° C. and under a weight of 5 kg.

Polymers (F) according to the invention are effective in cross-linking under effect of thermal treatment. The melt flow rate of the TFE/SFVE/Az1 copolymer of Example 1 is determined to be less than 0.5 g/10'.

The TFE/SFVE copolymer of Comparative Example 1, free from recurring units of type (Az), does not undergo similar cross-linking: the melt flow rate of the polymer of Comparative Example 1 was in fact 20.1 g/10'.

The invention claimed is:

1. A fluoropolymer [polymer (F)] comprising:
recurring units derived from at least one ethylenically unsaturated fluorinated monomer [monomer (FM)];
from 5% to 60% by moles, with respect to the total moles of recurring units of polymer (F), of recurring units derived at least one ethylenically unsaturated fluorinated monomer containing at least one —SO$_2$F functional group [monomer (IO)]; and
from 0.01% to 10% by moles, with respect to the total moles of recurring units of polymer (F), of recurring units derived from at least one monomer comprising an azide group [monomer (Az)], wherein monomer (Az) does not comprise a (per)fluorovinyl ether end group of formula CF$_2$=CF—O—.

2. The polymer (F) of claim 1, wherein monomer (Az) complies with formula (I):

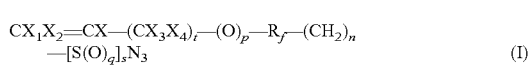

wherein: X, X$_1$, X$_2$, X$_3$ and X$_4$ equal to or different from each other, are independently H or F, t is 0 or 1, p is 0 or 1, n is an integer from 0 to 4, s is 0 or 1, q is 1 or 2, and R$_f$ is a divalent fluorocarbon group, optionally interrupted by one or more ethereal oxygen atoms, with the proviso that, when p is 1, t is also 1.

3. The polymer (F) of claim 2, wherein monomer (Az) complies with formula (IV):

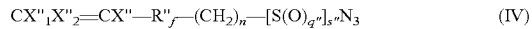

wherein: X", X"$_1$ and X"$_2$, equal to or different from each other, are independently H or F, n" is an integer from 0 to 4, s" is 0 or 1, q" is 1 or 2, R"$_f$ is a divalent fluorocarbon group, optionally interrupted by one or more ethereal oxygen atoms, wherein the sp$^2$ hybridized carbon atom of the terminal double bond =CX"— is bound to a sp$^3$ carbon atom of the R"$_f$ group.

4. The polymer (F) of claim 3, wherein q" is 2 and s" is 1.

5. The polymer (F) of claim 3, wherein monomer (Az) complies with formula (VI):

wherein: X", X"$_1$ and X"$_2$, equal to or different from each other, are independently H or F, R*$_f$ is a divalent perfluoroalkyl group, optionally interrupted by one or more ethereal oxygen atoms.

6. The polymer (F) of claim 3, wherein monomer (Az) complies with formula (VIII):

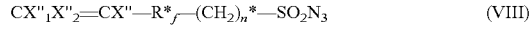

wherein: X", X"$_1$ and X"$_2$, equal to or different from each other, are independently H or F, n* is an integer from 1 to 4; R*$_f$ is a divalent perfluoroalkyl group, optionally interrupted by one or more ethereal oxygen atoms.

7. The polymer (F) of claim 3, wherein monomer (Az) complies with formula (XII):

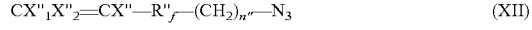

wherein: X", X"$_1$ and X"$_2$, equal to or different from each other, are independently H or F, n" is an integer from 0 to 4, R"$_f$ is a divalent fluorocarbon group, optionally interrupted by one or more ethereal oxygen atoms, wherein the sp$^2$ hybridized carbon atom of the terminal double bond =CX"— is bound to a sp$^3$ carbon atom of the R"$_f$ group.

8. The polymer (F) of claim 2, wherein monomer (Az) complies with formula (X):

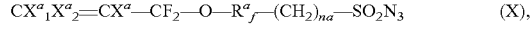

wherein: X$^a$, X$^a$$_1$ and X$^a$$_2$, equal to or different from each other, are independently H or F, na is an integer from 0 to 4 and —R$^a$$_f$— is a divalent perfluoroalkyl group having 1 to 6 carbon atoms.

9. The polymer (F) of claim 2, wherein the monomer (Az) complies with formula (XVII):

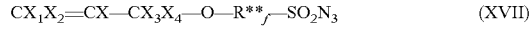

wherein: X, X$_1$, X$_2$, X$_3$ and X$_4$, equal to or different from each other, are independently H or F, R**$_f$ is a divalent fluorinated group, optionally comprising one or more than one ethereal oxygen atom.

10. A process for the manufacture of the polymer (F) of claim 1, said process comprising polymerizing a monomer mixture comprising at least one monomer (FM), at least one monomer (IO) and at least one monomer (Az).

11. A cross-linkable composition [composition (CC)] comprising the polymer (F) according to claim 1 and at least one curing agent in an amount of between 0.5% and 10% by weight relative to the polymer (F).

12. A method of cross-linking the polymer (F) of claim 1, the method comprising submitting polymer (F) to UV radiation and/or thermal treatment.

13. A cross-linked polymer (F) obtained by the method of claim 12.

14. An article comprising the cross-linked polymer (F) of claim 13.

15. The polymer (F) of claim 5, wherein $R^*_f$ is a divalent perfluoroalkyl group of formula $-(CF_2)_{m''}-$, wherein m" is an integer from 1 to 12.

16. The polymer (F) of claim 6, wherein $R^*_f$ is a divalent perfluoroalkyl group of formula $-(CF_2)_{m''}-$, wherein m" is an integer from 1 to 12.

17. The polymer (F) of claim 8, wherein $X^a$, $X^a_1$ and $X^a_2$ are each independently F, na is 0 and $-R^a_f-$ is $-CF_2CF_2-$.

18. The polymer (F) of claim 9, wherein X, $X_1$, $X_2$, $X_3$ and $X_4$ are each independently F.

19. A method of cross-linking composition (CC) according to claim 11, the method comprising submitting composition (CC) to UV radiation and/or thermal treatment.

20. A cross-linked composition (CC) obtained by the method of claim 19.

* * * * *